United States Patent [19]
List et al.

[11] Patent Number: 5,961,845
[45] Date of Patent: Oct. 5, 1999

[54] SOLID PRODUCT SYSTEM AND METHOD OF USING SAME

[75] Inventors: James Victor List, Erlanger, Ky.; Lyle Hermen Steimel, Forest Park, Ohio; Scott Winthrop Veil, Cincinnati, Ohio; Ed Bowden, Hamilton, Ohio; Holger Frank Schwab, Cincinnati, Ohio; James Charles Bricker, Waynesville, Ohio

[73] Assignee: Diversey Lever, Inc., Plymouth, Mich.

[21] Appl. No.: 08/976,801

[22] Filed: Nov. 24, 1997

Related U.S. Application Data

[63] Continuation-in-part of application No. 08/937,666, Sep. 26, 1997, abandoned.
[51] Int. Cl.⁶ ............................ B01D 17/12; B01D 11/02
[52] U.S. Cl. .................. 210/767; 210/139; 210/198.1; 137/268; 239/10; 239/310; 366/132; 366/137; 366/154.1; 422/261; 422/266
[58] Field of Search ............................ 210/86, 104, 138, 210/139, 141, 198.1, 744, 754, 764, 739, 767; 137/268; 239/10, 310; 422/106, 116, 261, 263, 264, 265, 266, 268, 269, 277, 278; 206/524.7; 222/64, 65, 129, 190; 366/132, 137, 167.1, 168.1, 153.1

[56] References Cited

U.S. PATENT DOCUMENTS

| | | | |
|---|---|---|---|
| 4,100,070 | 7/1978 | White | 210/136 |
| 4,687,121 | 8/1987 | Copeland | 222/64 |
| 4,826,661 | 5/1989 | Copeland et al. | 422/106 |
| 4,830,509 | 5/1989 | Gulmatico | 366/153 |
| 4,964,185 | 10/1990 | Lehn | 137/268 |
| 5,078,301 | 1/1992 | Gladfelter et al. | 222/52 |
| 5,147,615 | 9/1992 | Bird et al. | 422/261 |
| 5,211,475 | 5/1993 | McDermott | 366/137 |
| 5,253,937 | 10/1993 | Scheimann et al. | 366/165.4 |
| 5,262,132 | 11/1993 | Bricker et al. | 422/263 |
| 5,683,575 | 11/1997 | Yates et al. | 210/138 |
| 5,849,253 | 12/1998 | Crossdale et al. | 422/264 |

*Primary Examiner*—Joseph W. Drodge

[57] ABSTRACT

A dispenser system for treating water containing systems in place with a dry chemical substance. The dispenser has a water soluble pouch housing a dry form of a chemical material to be used in treating the system. The pouch is positioned in a make down unit so that the chemical is dissolved to form a liquid concentrate which is then introduced into a water containing system. A controller is attached to the make down unit to regulate the flow of water into the apparatus and the flow of liquid concentrate out of the apparatus and into the water containing system.

8 Claims, 4 Drawing Sheets

SOLID PRODUCT SYSTEM AND METHOD OF USING SAME

This is a continuation-in-part application of Ser. No. 08/937,666 filed Sep. 26, 1997, now abandoned.

FIELD OF THE INVENTION

This invention relates to a system for treating water systems with a chemical substance which is user and environmentally friendly.

BACKGROUND OF THE INVENTION

A variety of chemical products are used to treat water treatment systems such as cooling towers, boilers, closed loop systems, etc. The chemical products include corrosion inhibitors, such as polymers for preventing the deposition of phosphates, molybdates, sulfite etc.; semi-sludge conditioners to prevent the formation of sludge in such systems; and detergent formulations.

In present day water treatment technology, liquid products containing one or more components are manufactured and then shipped in containers such as drums, to the end users. The process is labor and material intensive requiring the shipment of heavy drums which must be disposed of once the chemical product is used.

To overcome some of these problems, manufacturers have produced dry pellets of chemical products to ship to end users for use in the water system. However, the pellets must dissolve at a more or less controlled rate, depending on water flow, chemistry and temperature and thus uneven distribution of product often occurs. Typically, the active chemical, which is added as a single component and needed for a water system, is useful at a parts per million level which is difficult to control in such low concentration. Furthermore, the physical dimension and weight requirements for a chemical product to be introduced in a water system for a multiday supply can be excessive and difficult to manage. Finally, the end user may physically come in contact with the concentrated chemical when it is introduced into the water system.

SUMMARY OF THE INVENTION

The present invention addresses the problems of treating water systems with a dispenser system and a method for dispensing chemical substances. The method includes preparing a dry form of a single or multi component chemical material, packaging the dry form of the material in a water soluble container, shipping the containers to the end user's site, reconstituting the dry material of the water soluble containers to a liquid form at the user's site, using a make-down apparatus to form a specific chemical concentrated product and dispensing the liquid concentrate into a water system to treat the water system. The dispensing system, as well as the particular make-down apparatus of the system are also described.

The invention will be further appreciated in light of the following detailed description and drawing.

DETAILED DESCRIPTION OF PREFERRED EMBODIMENTS

The present invention is described with respect to water systems such as cooling towers, boilers, etc. but it should be understood that this invention applies equally to any in-line water system using flushing water and requiring the delivery of chemical product in place.

A chemical product which is to be used to treat a water system is prepared in a dry form and packaged in a pouch. The pouch is shipped to an end user's site in a make down apparatus 10 or the pouch may be shipped separately.

Figure 1:
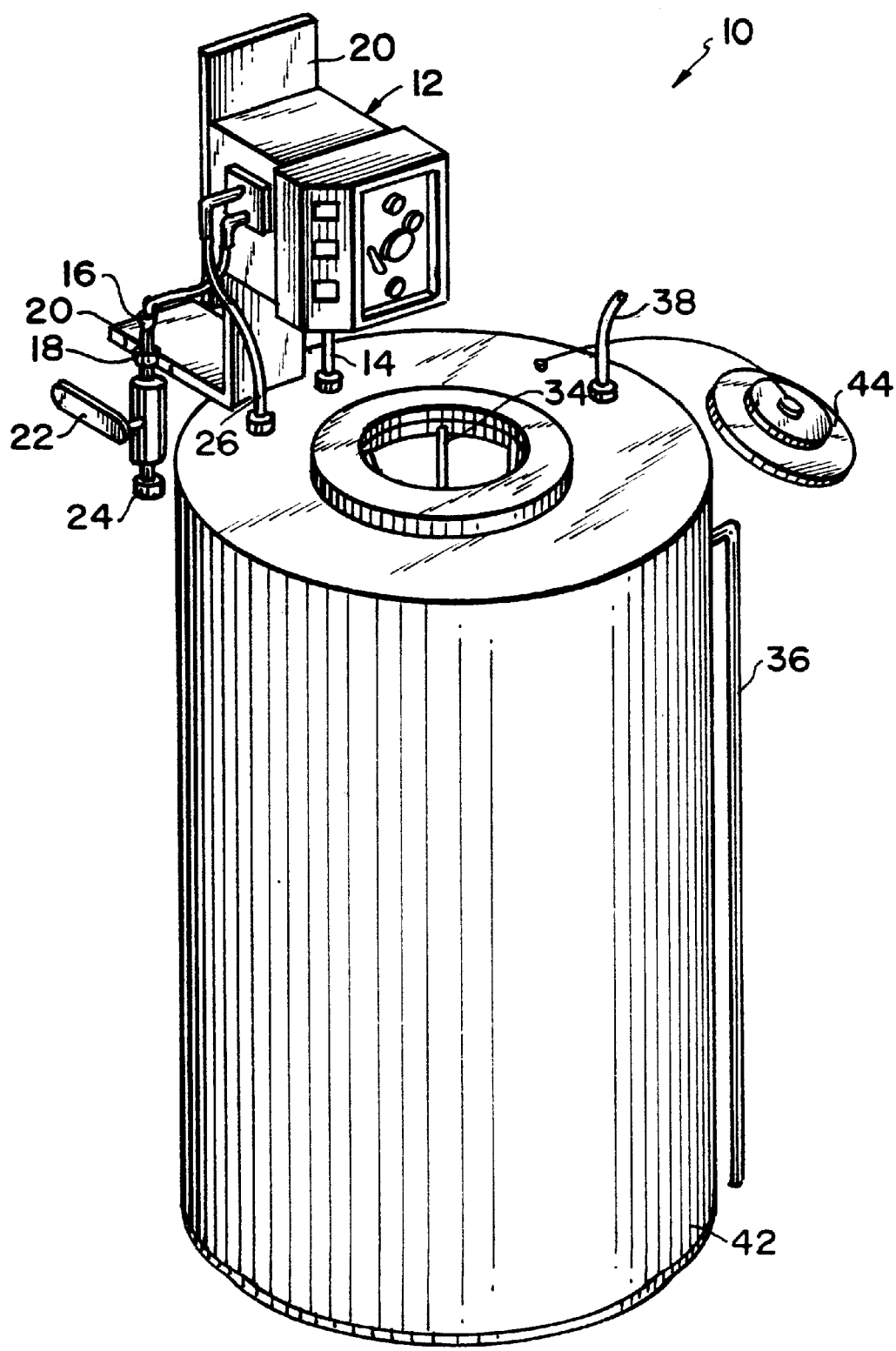
FIG. 1 is a plan view of the make down unit of the invention.
Figure 2:
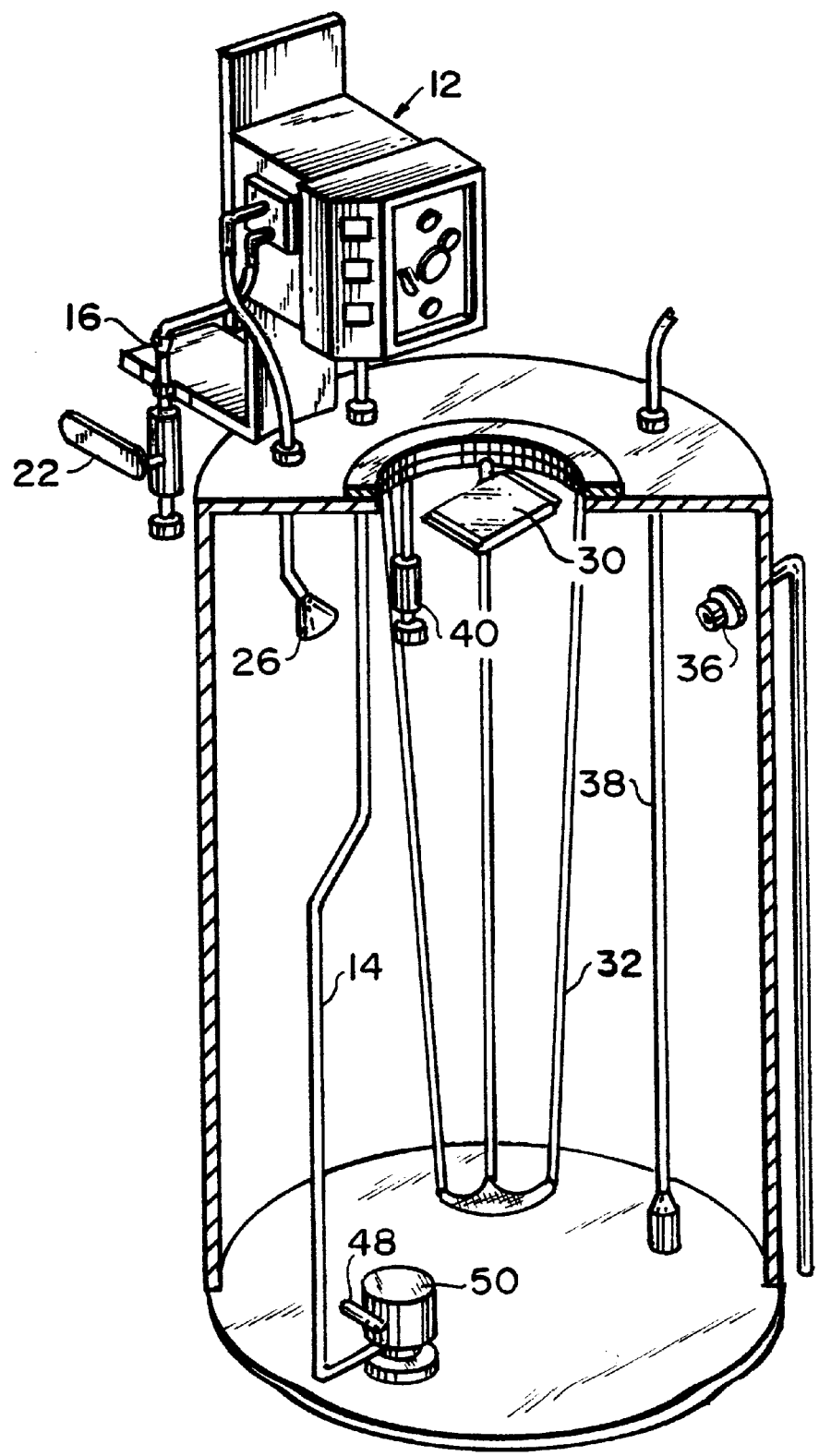
FIG. 2 is a cross sectional view of the make down unit.
Figure 3:
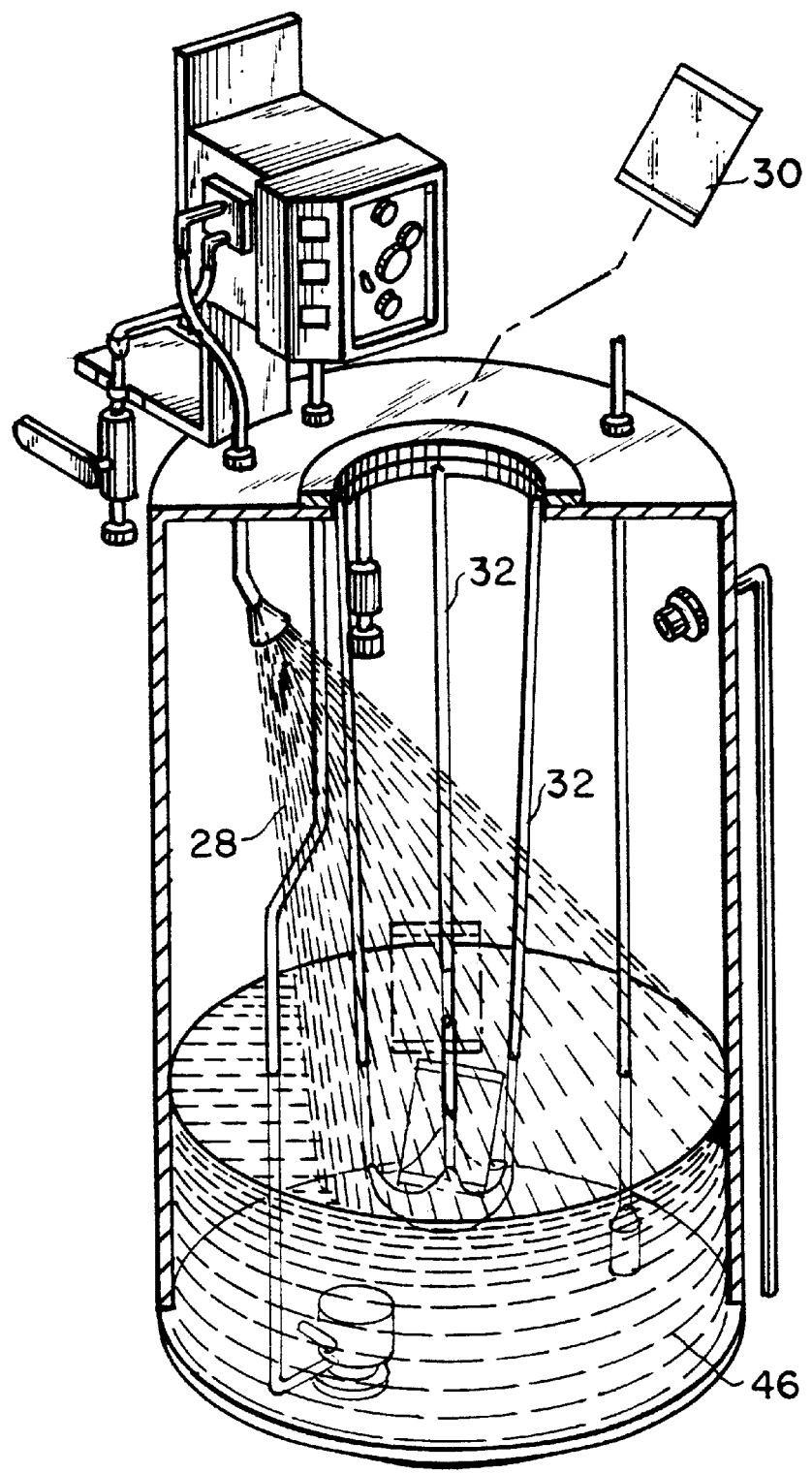
FIG. 3 is a cross sectional view of the pouch in the make down unit.

As illustrated in FIG. 1, upon arrival at the end user's site the pouch 30 is positioned in an opening 31 containing a webbing 32 of a tank 42 of the make down apparatus 10 as shown in FIG. 3. The webbing extends from a top portion of the make down apparatus 10 to a bottom portion. The webbing 32 helps position the pouch 30 near the bottom portion of the apparatus 10. The webbing also prevents chemical splashback to protect the operator from chemical contact. A circulator pump 50 having a pump outlet 48 is attached to the bottom portion as illustrated in FIG. 2.

The make down unit 10 is preferably a cylindrical container with an opening 31 on its top end. The webbing 32 is attached around the opening 31 by any conventional means.

A controller 12 having an electric cord 14 is attached to the top portion of the make down apparatus and controls the flow of water into the apparatus 10, as well as the flow of concentrated product out of the apparatus once the dry material of the pouch 30 has dissolved. Attached to the controller is a spray nozzle 26 for introducing water spray 28 over the pouch 30 and into the make down unit 10 to assist in the dissolution of the dry material into the water to form a concentrate. Also attached to the controller 12 is high level alarm float 40 which signals the user as to the level of water or concentrated product in the make down unit to prevent overflow and spills.

The controller 12 preferably utilizes a variable batching process which is conventionally known in the art. A start button on the control box operates a water solenoid valve to begin the dissolving process. Timers of the controller predetermine the time required for the dissolution process to terminate the dissolving process at the appointed time.

Water control is maintained in conjunction with the controller and flow restrictor 16 to modify the water flow as water is introduced in the make down unit apparatus 10. The circulator 50 pump preferably attached to the bottom of the make down apparatus 10 and to the controller 12 itself operates at a predetermined speed and velocity to circulate the water in the make unit apparatus and to dissolve the dry material to form a homogenous mixture.

Overflow and spill are controlled by an overflow nozzle 36 located near the top portion of the make down unit 10.

Figure 4:
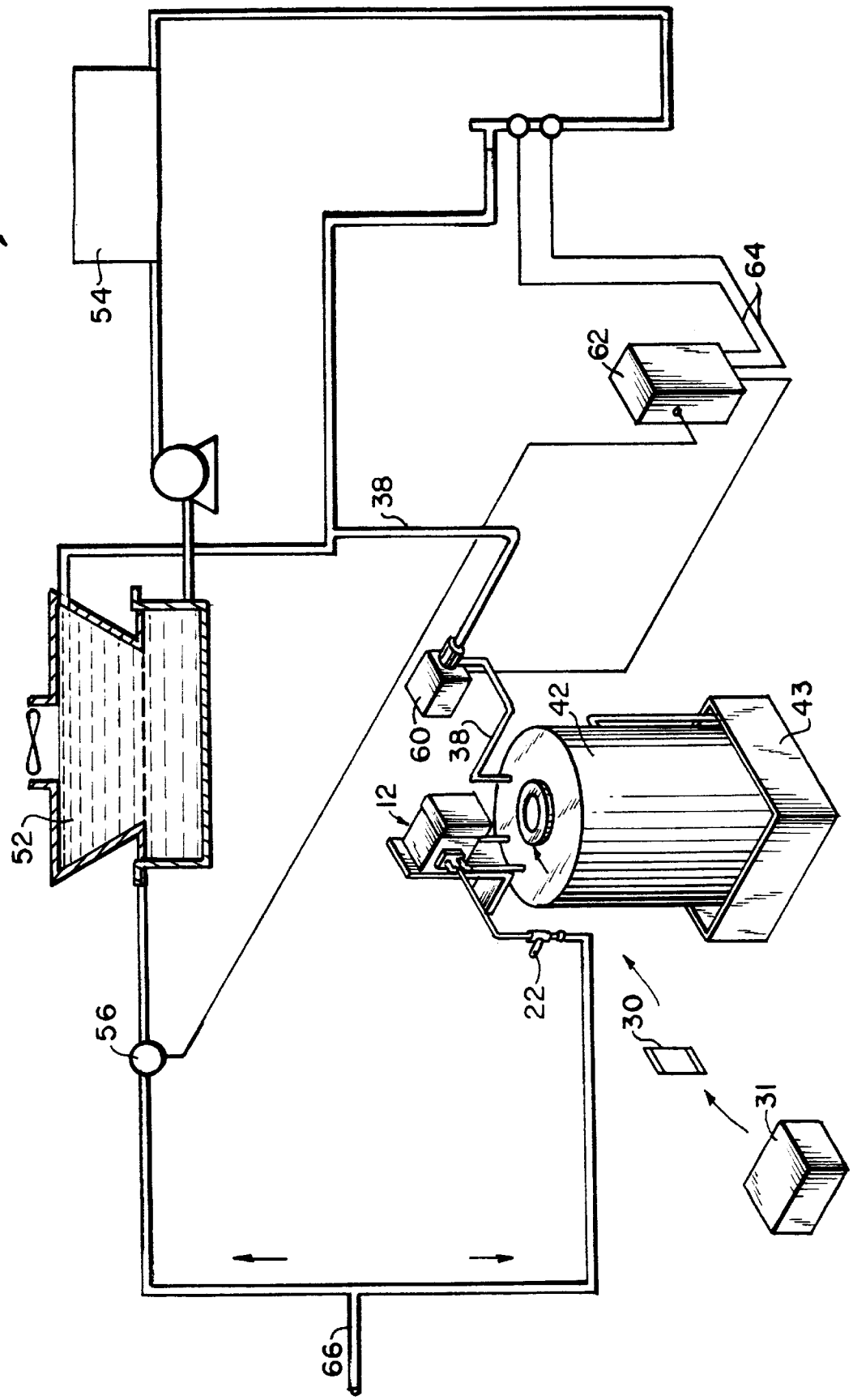
FIG. 4 is a diagrammatic view of the inventive dispensing system.

In operation, as illustrated in FIGS. 1 and 4, a top cover 44 of the make down unit 10 is lifted and the pouched dry chemical product is dropped into the opening 30 and positioned in the webbing 32 as illustrated in FIG. 3. Based upon a predetermined start time as programmed by the end user, water is introduced into the make down unit 10 through a domestic water line and its flow and amount controlled by the controller. Water is introduced through the domestic water line into the make down unit 10 through the spray nozzle 26 which sprays the water over the diameter of the make down unit to introduce water into the tank 42 and to assist in the dissolution of the water soluble pouch 30.

During the introduction of the water, the circulator pump 50 with its directional orifices begins to move water in the tank. Directional orifices are preferably positioned near the discharge of the pump to allow for superior mixing and continuous agitation to assist in dissolving of the product. The pump continues to circulate for a predetermined time to completely mix the dry product into a homogenous concentrated product.

At the end of the dissolution process, the concentrated liquid product is removed from the apparatus via either an out-take line 38 or through the opening 30 and is introduced into the water system to be treated.

The water soluble pouch is made of any water soluble material which will substantially or completely dissolve to release the product it contains. Such materials include polyurethane. A commercial material useful for the invention is sold by CMS Gilbreath under the trade name DP45 dissolving pouch.

One of the primary benefits of the present invention is the superior mixing of one or more chemical components to form a dry material which the user does not come in contact with and which is easily transportable to the end user site. The chemicals can be any number of conventional chemicals used to treat water systems.

Detergent formulations useful in the invention are described in U.S. Pat. No. 5,262,132 owned by Diversey Lever, Inc.

Suitable biocides, sludge conditioners, corrosion inhibitors, actives of the invention useful are also described in Andrade, R. C. et al., *Drew Principles of Industrial Water Treatment,* 6th Ed, 1983, pp. 61–71; 79–84 and 90–108 incorporated by reference.

The system may be programmed to dissolve multiple pouches as needed for a multiple day treatment period.

The system contains an overflow containment unit (not shown) to comply with the Department of Occupational Safety and Health Administration requirements.

The various safety features of the system prevent the end user from in contact with concentrated chemical material in either introducing the dry material into the make down unit or in preventing splash back and spill during the dissolution process and transportation of the concentrate to the water system to be treated.

What is claimed:

1. A dispenser system for treating a water containing system in place with a dry chemical substance comprising:
   (a) a water soluble pouch housing a dry form of a chemical material to be used in treating the water containing system;
   (b) a make down apparatus comprising a tank for receiving the water soluble pouch to form a liquid chemical concentrate, the apparatus comprising
      (i) controller means for pre-determining time internals for introducing water into the apparatus and for controlling flow of the liquid chemical concentrate to the water containing system being treated,
      (ii) spray nozzle means attached to the controller means and located at a top portion of the tank to introduce water into the apparatus as a spray and to assist in dissolving the water soluble pouch; and
      (iii) a circulator pump means, located in the tank, to circulate the water in the tank to form the liquid chemical concentrate.

2. A dispenser system according to claim 1 wherein the apparatus further comprises a means to exit the liquid chemical concentrate from the apparatus to the water containing system to be treated.

3. A dispenser system according to claim 1 wherein the water soluble pouch is formed of a material selected from a group consisting of polyvinyl alcohol, and polyvinyl acetate.

4. A dispenser system according to claim 1 wherein the controller means further comprises a variable batch system to introduce and retrieve liquids from the apparatus.

5. A dispenser system according to claim 1 wherein the apparatus further comprises a webbing which moves the water soluble pouch toward the circulator pump means at a bottom portion of the apparatus when the water soluble pouch is positioned therein.

6. A method for treating a water containing system with a dry chemical substance comprising:
   (a) preparing a dry form of one or more chemical substances;
   (b) packaging the dry form in a water soluble package to form a pouch for the chemical substance;
   (c) shipping the pouch with a make down apparatus comprising a tank to an end user's site, the apparatus comprising:
      (i) controller means for pre-determining the introduction of water into the apparatus and for the exiting of the concentrated product to a water containing system to be treated,
      (ii) spray nozzle means attached to the controller means and located in the top portion of the tank to introduce water into the apparatus as a spray and to assist in dissolving the water soluble pouch; and
      (iii) circulator pump means, located in the tank, to circulate the water in the tank to form a concentrated liquid chemical product;
   (d) reconstituting the chemical substance to a concentrated liquid form in the make down apparatus at the end user's site and
   (e) dispensing the liquid concentrate products to the water containing system to be treated.

7. A method according to claim 6 wherein the reconstituting step further comprises dissolving the dry chemical material to form a homogenous concentrated product.

8. A method according to claim 7 wherein the apparatus further comprises a means to exit the liquid concentrated product from the apparatus to the water containing system to be treated.

* * * * *